United States Patent [19]

Liu et al.

[11] Patent Number: 6,096,101
[45] Date of Patent: *Aug. 1, 2000

[54] METHOD OF PREPARING ELECTROCHEMICAL CELLS

[75] Inventors: Peikang Liu, Henderson; Porter Mitchell, Las Vegas; Feng Gao, Henderson, all of Nev.

[73] Assignee: Valence Technology, Inc., Henderson, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/811,845

[22] Filed: Mar. 5, 1997

[51] Int. Cl.$^7$ .............................. H01M 6/00; H01M 4/62
[52] U.S. Cl. ........................................... 29/623.1; 429/217
[58] Field of Search ............................................. 29/623.1

[56] References Cited

U.S. PATENT DOCUMENTS

| | | | |
|---|---|---|---|
| 4,166,870 | 9/1979 | Henson | 427/122 |
| 5,456,000 | 10/1995 | Gozdz et al. | 29/623.2 |
| 5,543,249 | 8/1996 | Takeuchi et al. | 429/217 |
| 5,609,795 | 3/1997 | Matsumoto et al. | 252/500 |
| 5,714,282 | 2/1998 | Tagawa | 429/217 |

*Primary Examiner*—Maria Nuzzolillo
*Assistant Examiner*—Tracy Dove
*Attorney, Agent, or Firm*—Young & Basile, P.C.

[57] ABSTRACT

Anodes, cathodes, and/or solid electrolytes (or separator layers) of an electrochemical cell can be fabricated from aqueous compositions containing monomers and/or polymers. In one formulation, the aqueous composition contains binding materials that are polymerized and crosslinked. In a second formulation, the composition is a latex having as aqueous phase and a solid polymer phase. Upon removal of water, the compositions provide a polymeric structure suitable for use as an electrode or solid electrolyte.

20 Claims, No Drawings

METHOD OF PREPARING ELECTROCHEMICAL CELLS

FIELD OF THE INVENTION

The present invention relates to electrochemical devices and, more particularly, to methods of fabricating electrochemical cells whereby the amount of organic solvents used in the manufacturing process is minimized.

BACKGROUND OF THE INVENTION

Non-aqueous lithium electrochemical cells typically include an anode, an electrolyte comprising a lithium salt that is dissolved in one or more organic solvents and a cathode of an electrochemically active material, typically a chalcogenide of a transition metal. During discharge, lithium ions from the anode pass through the liquid electrolyte to the electrochemically active cathode material of the cathode where the ions are taken up with the simultaneous release of electrical energy. During charging, the flow of ions is reversed so that lithium ions pass from the electrochemically active material through the electrolyte and are plated back onto the anode.

Recently, the lithium metal anode has been replaced with a carbon anode such as coke or graphite intercalated with lithium ions to form $Li_xC$. In operation of the cell, lithium ions pass from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595, 5,028,500, 5,441,830, 5,460,904 and 5,540,741.

Conventional methods of fabricating electrochemical cells typically consist of using organic solvents in making the electrodes and polymeric matrix (e.g., separator). For example, a solid electrolyte containing the polymeric matrix is prepared by curing a mixture comprising an organic solvent and solid matrix forming monomers and/or partial polymers thereof. Alternatively, the solid electrolyte is formed by solvent casting whereby a mixture comprising an organic solvent and a polymer is first coated onto the appropriate substrate. Thereafter, a polymeric film is formed upon removal of the solvent. Electrodes can also be fabricated by similar solvent casting techniques.

As is apparent, conventional methods of preparing electrochemical cell components require the use of significant organic solvents which pose environmental and health risks. These risks are particularly evident in the case of solvent casting since an evaporative step is required to extract the casting solvent (e.g., acetone) prior to insertion of the electrolyte solvent and inorganic salt. The organic solvents must therefore be recovered which further adds to the manufacturing costs.

SUMMARY OF THE INVENTION

The present invention is based in part on the discovery that the anode, cathode, and/or solid electrolyte (or separator layer) components of an electrochemical cell can be fabricated using aqueous compositions containing a binding material or polymer.

In one aspect, the invention is directed to a method of fabricating an electrode that includes the steps of:

(a) providing a latex composition comprising an aqueous phase and a solid phase that comprises a polymer;

(b) mixing an electrode active material into said latex composition to form a mixture; and (c) removing water from said mixture to form an electrode.

In a further aspect, the invention is directed a method of fabricating a polymer electrolyte that includes the steps of:

(a) providing a latex composition comprising an aqueous phase and a solid phase that comprises a polymer to form mixture;

(b) removing water from said mixture to form a polymeric layer; and (c) adding an electrolyte solution comprising an electrolyte solvent and a salt to the polymeric layer.

In another aspect, the invention is directed to a method of fabricating an electrochemical cell that includes the steps of:

(a) forming an anode by a process comprising the steps of:
  (i) providing a first latex composition comprising an aqueous phase and a solid phase that comprises a first polymer;
  (ii) mixing an anode active material into said first latex composition to form a first mixture; and
  (iii) removing water from said first mixture to form an anode;

(b) forming a cathode by a process comprising the steps of:
  (i) providing a second latex composition comprising an aqueous phase and a solid phase that comprises a second polymer;
  (ii) mixing a cathode active material into said second latex composition to form a second mixture; and
  (iii) removing water from said second mixture to form a cathode and;

(c) forming an electrolyte layer comprising a polymeric matrix by a process comprising the steps of:
  (i) providing a third latex composition comprising an aqueous phase and a solid phase that comprises a third polymer;
  (ii) removing water from the third latex composition to form a polymeric film; and
  (iii) adding a solution comprising an electrolyte solvent and a salt to said polymeric film to form said electrolyte layer, which is positioned between said anode and said cathode.

In preferred embodiments, the polymer is a fluoropolymer including polyvinylidenedifluoride, poly(vinlylidene difluoride-co-hexafluoropropylene), and mixtures thereof.

In another aspect, the invention is directed to a method of making an electrode that includes the steps of:

(a) providing an aqueous composition comprising a binding material that is selected from the group consisting of a polyester represented by formula I, a terpolymer represented by formula II, a melamine-formaldehyde represented by formula III, and mixtures thereof, wherein

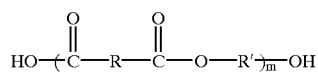

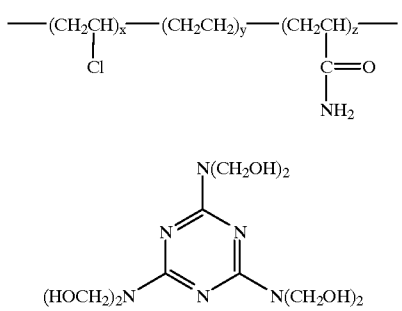

where R and R' are independently selected from $(CH_2)_n$, where n is an integer from about 2 to about 10, and a substituted or unsubstituted benzi, m is an integer that ranges from about 100 to about 10,000, x ranges from about 0.3 to about 0.7, y ranges from about 0.3 to about 0.7, and z ranges from about 0.02 to about 0.1;

(b) mixing an electrode active material into said aqueous composition to form a mixture; and (c) causing said binding material to polymerize and removing water from said mixture to form an electrode.

In a further aspect, the invention is directed to a method of fabricating a polymeric electrolyte that includes the steps of:

(a) providing an aqueous composition comprising a binding material that is selected from the group consisting of a polyester represented by formula I, a terpolymer represented by formula II, a melamine-formaldehyde represented by formula III, and mixtures thereof, as described above;

(b) causing said binding material to polymerize and removing water from said mixture to form a polymeric layer; and (c) adding an electrolyte solution comprising an electrolyte organic solvent and a salt to the polymeric layer.

In yet another aspect, the invention is directed to a method of making an electrochemical cell that includes the steps of:

(a) forming an anode by a process comprising the steps of:
 (i) preparing an aqueous anode composition comprising an anode active material and a first binding material that is selected from the group consisting of a polyester represented by formula I, a terpolymer represented by formula II, a melamine-formaldehyde represented by formula III, and mixtures thereof as described above; and
 (ii) causing the first binding material to polymerize and removing water from the anode composition to form said anode;

(b) forming a cathode by a process comprising the steps of:
 (i) preparing an aqueous cathode composition comprising a cathode active material and an effective amount of a second binding material that is selected from the group consisting of a polyester represented by formula I, a terpolymer represented by formula II, a melamine-formaldehyde represented by formula III, as defined above and mixtures thereof; and
 (ii) causing the second binding material to polymerize and removing water from the cathode composition to form said cathode; and (c) forming an electrolyte layer comprising a polymeric matrix by a process comprising the steps of:
 (i) preparing an aqueous polymeric composition comprising a third binding material that is selected from the group consisting of a polyester represented by formula I, a terpolymer represented by formula II, a melamine-formaldehyde represented by formula III, and mixtures thereof as described above; and
 (ii) causing the third binding material to polymerize and removing water from the polymeric composition to form a polymeric film; and
 (iii) adding a solution comprising an electrolyte solvent and a salt to said polymeric film to form said electrolyte layer, which is positioned between said anode and said cathode.

DETAILED DESCRIPTION OF THE PREFERRED EMBODIMENTS OF THE INVENTION

The present invention is directed to a method of preparing electrodes and solid electrolytes (or separators) suitable for use in electrochemical cells. The invention is particularly applicable to electrochemical cells which include: a cathode comprising an active material, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode preferably has a current collector. Particularly preferred electrochemical cells and batteries use lithium and salts thereof.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability. Preferred plasticizers include, for example, dibutyl phthalate, dioctylphthalate, and acetates, glymes, and low molecular weight polymers. Typically, when a plasticizer is used, it is first well mixed with the polymer.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and a solid ion-conducting electrolyte (or separator) interposed therebetween.

The term "battery" refers to two or more electrochemical cells electrically interconnected in an appropriate series/parallel arrangement to provide the required operating voltage and current levels.

The term "solid electrolyte" or "separator" refers to the ion-conducting layer interposed between the negative and positive electrodes of an electrochemical cell. This polymeric layer is fabricated by the inventive technique of employing a latex composition comprising an aqueous phase and a solid phase that contains a polymer. Alternatively, the layer is fabricated from an aqueous composition containing one or more binding materials.

Aqueous composition with polymerizable binding material. The polymeric layer is prepared from an aqueous composition comprising a polyester, a terpolymer, a melamine-formaldehyde, or mixtures thereof.

1. The polyester, with terminal alcohol groups, is represented by the following formula (I):

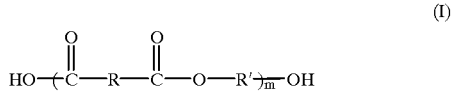

(I)

where R and R' are independently selected from $(CH_2)_n$, where n is an integer from about 2 to about 10 and a substituted or unsubstituted benzl. m is an integer that typically ranges from about 100 to about 10,000 to provide a water soluble polyester. Preferably m is from about 250 to about 5,000, more preferably from about 500 to about 2,500. Preferred polyesters include, for example, poly(ethylene succinate) and poly(ethylene terephthalate). Preferably, the molecule weight of the polyester ranges from about 50,000 to about 200,000. The polyesters can be prepared by condensation reactions between a diacid (HOOC—R—COOH) and a diol (HO—R'—OH).

2. The vinyl chloride/ethylene/acrylamide terpolymer is represented by the following formula (II):

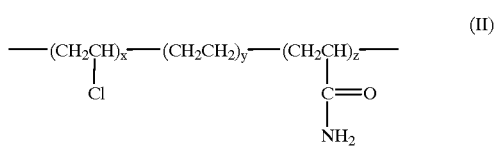

(II)

The terpolymer is a substantially random terpolymer wherein x, y, and z represent the fractional make-up of the three monomers. Preferably x ranges from about 0.3 to about 0.7, y ranges from about 0.3 to about 0.7, and z ranges from about 0.02 to about 0.10. The terpolymers can be prepared by free radical polymerization of vinyl chloride, ethylene and acrylamide monomers in an aqueous mixture. Preferably, the molecule weight of the terpolymer ranges from about 10,000 to about 100,000.

3. The melamine-formaldehyde (III) is synthesized by the following reaction:

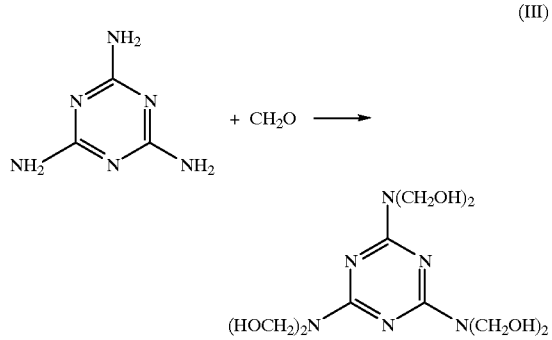

(III)

In a preferred embodiment a polymeric matrix is formed from an aqueous composition comprising (1) about 5% to about 25% of the polyester, (2) about 3% to about 10% of the terpolymer, and (3) about 1 % to about 5% of the melamine-formaldehyde resin. Preferably, the binding material comprises from about 30% to about 60%, more preferably from about 35% to about 55%, and most preferably from about 40% to about 50% of the aqueous composition. (All percentages are on a weight basis unless otherwise specified.) All three reagents are generally commercially available as aqueous formulations. A plasticizer can also be added to the aqueous composition.

These three binding materials will polymerize and crosslink at elevated temperatures. For example, the aqueous composition can be casted onto a substrate and thereafter heated to a temperature that preferably ranges from about 50° C. to about 80° C. The reaction sites are the terminal alcohol groups in the polyester, the amide groups in the terpolymer, and methylol in the melamine-formaldehyde resin. The water is removed before activation. The polymeric electrolyte should have less than 500 ppm water.

Latex formulation. The polymeric layer can also be prepared from a latex comprising an aqueous phase and a solid phase containing a polymer. The latex composition may further include a plasticizer and surfactant to stabilize the formulation. The polymeric layer is formed by removing the water from the latex. For example, the aqueous composition can be casted onto a substrate and thereafter heated to a temperature in the range of preferably from about 100° C. to about 150° C. Latex technology is well known and is described, for example, in Kirk-Othmer, "Encyclopedia of Chem. Tech.," 3d Ed., John Wiley & Sons. Vol 14 pages 82–97.

Suitable polymers for the solid phase include, for example, fluoropolymers, including polyvinylidenedifluoride, (PVdF), and poly(vinylidene difluoride-co-hexafluoropropylene), poly(VdF-HFP), and mixtures thereof. If the copolymer is used, the content of PVdF in polyPVdF-HFP is about 70% to about 99.9% more preferably about 80% to about 97% and most preferably about 85% to about 95%. Preferred molecular weights of the polymers are from 10,000 to 700,000, more preferably 100,000 to 650,000, and most preferably 150,000 to 600,000.

Preferably, the solid phase (e.g., fluoropolymer) comprises approximately from about 3% to about 30%, more preferably from about 5% to about 20%, and most preferably from about 7% to about 15% of the latex composition. Following removal of the water from the composition, sufficient amounts of an electrolyte solvent and inorganic salt are added to form the solid electrolyte.

The latex containing a fluoropolymer is prepared from suitable monomers by conventional emulsion processes whereby the emulsion is heated to polymerize the monomers. The polymer that forms becomes insoluble, (or forms solids) with increasing molecular weight. The result is a stable two-phase latex system.

When the anode and/or cathode of the invention are fabricated by the inventive techniques as described herein, the solid electrolyte layer can be fabricated by the above inventive techniques or it can be prepared by conventional ones in making an electrochemical cell. Conventional techniques include, for example, curing solid matrix forming monomers or prepolymers thereof or by solvent casting as described further herein. Conversely, if the solid electrolyte is fabricated from an aqueous composition, preferably the anode and cathode are also fabricated from aqueous compositions. However, the electrodes can be prepared by conventional methods as described herein in fabricating an electrochemical cell.

The solid electrolyte with the polymeric matrix can also be formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. Nos. 5,501,921, 5,498,491, 5,491,039, 5,489,491, 5,482,795, 5,463,179, 5,419,984, 5,393,621, 5,358,620, 5,262,253, 5,346,787, 5,340,669, 5,300,375, 5,294,501, 5,262,253, and 4,908,283, which are incorporated herein. Inorganic monomers are disclosed in U.S. Pat. Nos. 4,247,499, 4,388,385, 4,414,607, 4,394,280, 4,432,891, 4,539,276, and 4,557,985, which are incorporated herein.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluroide and hexafluoropropylene dissolved in acetone or other suitable solvent. Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The solid electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate (PC), ethylene carbonate (EC), methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is preferably added in the electrolyte.

For electrochemical cells where (1) the cathode comprises lithiated cobalt oxides, lithiated manganese oxides, lithiated nickel oxides, $LiNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferred organic carbonates include, for example, aliphatic carbonates and cyclic aliphatic carbonates.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an acyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

Electrodes of the present invention can be fabricated by employing the (1) aqueous composition containing a polymerizable binding material or (2) latex formulation generally as described above. With the aqueous composition, a composition comprising an electrode active material (anode or cathode) is included. After curing (e.g., heating) water is removed from the composition. For fabricating anodes, preferably, prior to removal of the water, the binding material comprises from about 10% to about 35%, more preferably from about 12% to about 30%, and most preferably from about 15% to about 25% of the aqueous composition. Similarly, for fabricating cathodes, prior to removal of the water, the binding material comprises from about 5% to about 30%, more preferably from about 8% to about 25%, and most preferably from about 10% to about 20% of the aqueous composition. Plasticizers may also be added to the aqueous composition.

With the latex formulation, the electrode is formed from a latex composition having an aqueous phase and a solid phase containing the polymers as described above. Appropriate amounts of an electrode active material is added in the formulation. The latex may further include a plasticizer and surfactant to stabilize the formulation. Preferably, prior to removal of the water, the fluoropolymer comprises from about 3% to about 30%, more preferably from about 5% to about 20%, and most preferably from about 7% to about 15% of the latex. In one embodiment, the layer of aqueous electrode composition is casted onto a substrate and the layer is heated to a temperature preferably between 100° C. to 150° C. to remove the water.

Electrodes fabricated by the inventive techniques preferably have less than 500 ppm water.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. The anode may also include an electron conducting material such as carbon black.

The anode of the present invention generally comprises an anode film that is laminated onto one or both sides of the current collector which is a thin metal foil or grid. Typically, each anode film is from about 100 $\mu$m to about 250 $\mu$m in thickness, preferably about 110 $\mu$m to about 200 $\mu$m, and more preferably about 125 $\mu$m to about 175 $\mu$m.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$), as described in U.S. Pat. No. 5,561,007, which is incorporated herein.

Similarly, the cathode of the present invention generally comprises a cathode film that is laminated onto one or both sides of the current collector which is a thin metal foil or grid. Typically, each cathode film is from about 100 $\mu$m to about 200 $\mu$m in thickness, preferably about 130 $\mu$m to about 175 $\mu$m, and more preferably about 140 $\mu$m to about 165 $\mu$m.

The anode and cathode each also includes a current collector that comprises, for example, a screen, grid, expanded metal, woven or non-woven fabric or knitted wire formed from an electron conductive material such as metals or alloys. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

In one preferred embodiment, the cathode may include an electroconductive material including, by way of example, graphite, powdered carbon, powdered nickel, metal particles, conductive polymers (i.e., characterized by a conjugated network of double bonds like polypyrrole and polyacetylene), and the like.

The solid electrolyte typically comprises from about 5% to about 25% of the inorganic ion salt based on the total weight of the electrolyte; preferably, from about 10% to 20%; and even more preferably from about 10% to about 15%. The percentage of salt depends on the type of salt and electrolytic solvent employed. Similarly, the solid electrolyte typically comprises from 1% to about 80% electrolyte solvent; preferably from about 60% to about 80%; and even more preferably about 70%. Furthermore, the solid electrolyte typically comprises from about 5% to about 30% of the solid polymeric matrix based on the total weight of the electrolyte; preferably from about 15% to about 25%.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,384,213, 5,346,385, 5,262,253, 4,472,487, 4,668,595, 5,028,500, 5,584,893, and U.S. patent application Ser. No. 08/630,985 entitled "Method and Apparatus For Preparing Electrochemical Cells" filed Apr. 12, 1996, now U.S. Pat. No. 5,746,781 all of which are incorporated herein. The inventive method can be adapted to form the anode, cathode, and/or polymeric matrix structures for use in prior art electrochemical cells. As is apparent, when the anode and/or cathode are fabricated by the inventive technique of employing the aqueous composition or latex formulation, alternatively the solid electrolyte (or separator layer) can be fabricated using conventional methods. Similarly, when the polymeric electrolyte is prepared by the inventive technique, the anode and cathode of an electrochemical cell can be fabricated by conventional methods. The following illustrates a method of how an electrolytic cell could be fabricated with the inventive process. Examples 1 and 2 describe the process of preparing the anode and cathodes, respectively. Example 3 describes the procedures for fabricating a solid electrolytic cell.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

A water based anode formulation containing components listed in the following Table 1 was prepared. The binders, graphite, plasticizer, and water were mixed before the crosslinking agent and catalyst were added. An anode film was prepared by casting a film of the mixture onto a glass plate. The film was then dried at a temperature of about 60° C. for about 16 hours to remove essentially all the water. The terminal alcohol and acrylamide functional groups are crosslinked during the drying process. An anode is formed by laminating a film on each side of an anode current collector. A preferred current collector is a sheet of expanded copper metal that is about 50 $\mu$m thick. It is available under the designation DELKER #2 Cu5-125 (flatten) Delker Corp., Branford, Conn.

TABLE 1

| Components | Active ingredient | primary function | wt % wet | wt % dry |
| --- | --- | --- | --- | --- |
| BAYHYDROL B-130 ™ | polyester with terminal alcohol groups | binder | 12% | 18.5% |
| VANCRYL 610 ™ | vinyl chloride-ethylene copolymer acrylamide | binder | 6% | 9.2% |
| CYMEL 385 ™ | melamine/formaldehyde | cross linking reagent | 3% | 4.6% |
| Acetic acid (3%$_{(aq)}$) | | catalyst | 1% | |
| BG-35 ™ | natural graphite | active material | 32% | 49.2% |
| 1:1 of propylene carbonate and ethylene carbonate | | plasticizer | 12% | 18.5% |
| Water | | solvent | balance | |

The BAYHYDROL B-130 ™ (Bayer Corp., Pittsburgh, PA), VANCRYL 610 ™ (Air Products, Allentown, PA) and CYMEL 385 ™ (Cytec Industries, Inc., West Paterson, NJ) are each an emulsion formulation.

EXAMPLE 2

A cathode can be prepared using the same mixture as in Example 1 except that LiMn$_2$O$_4$ was used instead of the graphite. Following formation of the cathode films, they are laminated onto each side of a cathode current collector which can be a sheet of expanded aluminum that is about 50 $\mu$m thick. The aluminum grid is available under the designation 2AL5-077 from Delker.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting an aqueous mixture containing PVDF, which is available in latex form as KYNAR 32™, from Elf Atochem North America, Philadelphia, Pa. Specifically, the mixture contained approximately 9% KYNAR 32™, 12% dibutyl phthalate, 6% fumed silica (AEROSIL R812™, from Degussa AG, Frankfurt, Germany), and the balance water. The mixture was ball milled for at least 24 hours before casting. The mixture can be coated onto a suitable substrate or carrier web and heated to between about 100° C. to 150° C. to remove the water. The precursor is then packaged in moisture-impermeable material which is described, for example, in U.S. Pat. No. 5,326,653 which is incorporated herein. Next, activation by addition of the electrolyte solvent and inorganic salt preferably takes place in an inert (e.g., argon) atmosphere. Finally, the packaging is sealed and the electrochemical cell is ready for use. It is expected that electrochemical cells and components thereof made by the inventive process will, among other things, demonstrate superior structural integrity including excellent physical strength.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of fabricating an electrode that comprises the steps of:

(a) providing an aqueous composition comprising a polymerizable binding material and an electrode active material that is selected from the group consisting of anodic material and cathodic material;

(b) casting a layer of said aqueous composition; and (c) polymerizing the polymerizable binding material and removing water from said layer to form an electrode wherein prior to removing the water, the polymerizable binding material comprises about 5% to 35% by weight of the aqueous composition.

2. The method of claim 1 wherein the step (b) comprises casting a layer of said aqueous composition onto a substrate and step (c) comprises heating the layer to a temperature of between 100° C. to 150° C.

3. The method of claim 1 wherein the polymer is a fluoropolymer with a molecular weight of from 150,000 to 600,000.

4. The method of claim 1 wherein the polymer is selected from the group consisting of polyvinylidenedifluoride, poly (vinylidene difluoride-co-hexafluoropropylene), and mixtures thereof.

5. The method of claim 1 wherein the aqueous composition farther comprises a plasticizer.

6. The method of claim 1 wherein the electrode active material is anodic material selected from the group consisting of graphite, mesocarbon, coke, and mixtures thereof.

7. The method of claim 1 wherein the electrode active material is cathodic material selected from the group consisting of lithiated cobalt oxides, lithiated manganese oxides, lithiated nickel oxides, and mixtures thereof.

8. A method of fabricating an electrochemical cell that comprises the steps of:
  (a) forming an anode by a process comprising the steps of:
    (i) providing a first aqueous composition comprising a first polymerizable binding material and an anode active material;
    (ii) casting a first layer of the first aqueous composition; and
    (iii) polymerizing the first polymerizable binding material and removing water from said first layer to form an anode wherein prior to removing the water the first polymerizable binding material comprises 10% to 35% by weight of the first aqueous composition;
  (b) forming a cathode by a process comprising the steps of:
    (i) providing a second aqueous composition comprising a second polymerizable binding material and a cathode active material;
    (ii) casting a second layer of the second aqueous composition; and
    (iii) polymerizing the second polymerizable binding material and removing water from said second layer to form a cathode wherein prior to removing the water the second polymer comprises 5% to 30% by weight of the second aqueous composition; and
  (c) forming an electrolyte layer comprising a polymeric matrix by a process comprising the steps of:
    (i) providing a third aqueous composition comprising a third polymerizable binding material;
    (ii) casting a layer of the third aqueous composition;
    (iii) polymerizing the third polymerizable binding material and removing water from the layer of the third aqueous composition to form a polymeric film wherein prior to removing the water, the polymerizable binder material comprises 30% to 60% by weight of the third aqueous composition; and
    (iv) adding a solution comprising an electrolyte solvent and a salt to said polymeric film to form said electrolyte layer, which is positioned between said anode and said cathode.

9. The method of claim 8 wherein the step of removing water from said first aqueous composition comprises casting a layer of said first aqueous composition onto a substrate and heating the layer to a temperature of between 100° C. to 150° C. and wherein the step of removing water from said second aqueous composition comprises casting a layer of said second aqueous composition onto a substrate and heating the layer to a temperature of between 100° C. to 150° C.

10. The method of claim 8 wherein the first, second, and third polymerizable binding material are each a fluoropolymer with a molecular weight of from 150,000 to 600,000.

11. The method of claim 8 wherein the first, second, and third polymerizable binding material when polymerized form polymers that are each selected from the group consisting of polyvinylidenedifluoride, poly(vinylidene difluoride-co-hexafluoropropylene), and mixtures thereof.

12. The method of claim 8 wherein the first, second, and third aqueous compositions each includes a plasticizer.

13. The method of claim 8 wherein the anode active material is selected from the group consisting of graphite, mesocarbon, coke, and mixtures thereof and the cathode active material is selected from the group consisting of lithiated cobalt oxides, lithiated manganese oxides, lithiated nickel oxides, and mixtures thereof.

14. The method of claim 1 wherein the electrode active material is anodic material.

15. The method of claim 1 wherein the aqueous composition consists essentially of the polymerizable binding material, electrode active material, plasticizer, and water.

16. The method of claim 1 wherein the aqueous composition consists essentially of the polymerizable binding material, electrode active material, catalyst, cross-linking agent, plasticizer, and water.

17. The method of claim 8 wherein the first aqueous composition consists essentially of the polymerizable binding material, anode active material, plasticizer, and water.

18. The method of claim 8 wherein the first aqueous composition consists essentially of the polymerizable binding material, anode active material, catalyst, cross-linking agent, plasticizer, and water.

19. The method of claim 8 wherein the second aqueous composition consists essentially of the polymerizable binding material, cathode active material, plasticizer, and water.

20. The method of claim 8 wherein the second aqueous composition consists essentially of the polymerizable binding material, cathode active material, catalyst, cross-linking agent, plasticizer, and water.

* * * * *